United States Patent [19]

Kagawa et al.

[11] Patent Number: 5,078,981

[45] Date of Patent: Jan. 7, 1992

[54] METHOD FOR CATALYTICALLY DECOMPOSING NITROGEN OXIDES

[75] Inventors: Shuichi Kagawa; Yasutake Teraoka, both of Nagasaki, Japan

[73] Assignee: Tosoh Corporation, Shinnanyo, Japan

[21] Appl. No.: 549,159

[22] Filed: Jul. 6, 1990

[30] Foreign Application Priority Data

Oct. 2, 1989 [JP] Japan ................................. 1-255182

[51] Int. Cl.$^5$ .......................... B01J 8/00; C01B 21/00
[52] U.S. Cl. .................................................... 423/239
[58] Field of Search .............. 423/235, 235 D, 239 A, 423/239

[56] References Cited

U.S. PATENT DOCUMENTS

| | | | |
|---|---|---|---|
| 3,689,212 | 9/1972 | Petit et al. | 423/239 |
| 4,778,665 | 10/1988 | Krishnamurthy et al. | 423/237 |
| 4,798,813 | 1/1989 | Kato et al. | 423/239 |
| 4,867,954 | 9/1989 | Staniulis et al. | 423/239 |

FOREIGN PATENT DOCUMENTS 60-125250  7/1985  Japan .

Primary Examiner—Gregory A. Heller
Attorney, Agent, or Firm—Nixon & Vanderhye

[57] ABSTRACT

A catalyst and a method for catalytically decomposing nitrogen oxides; the catalyst being composed of a zeolite having a mole ratio of $SiO_2/Al_2O_3$ of at least 20 and containing copper ions and magnesium ions.

2 Claims, No Drawings

METHOD FOR CATALYTICALLY DECOMPOSING NITROGEN OXIDES

BACKGROUND OF THE INVENTION

1. Field of the Invention

The present invention relates to a catalyst for removing nitrogen oxides from a gas containing the same, and a method of using the catalyst. More particularly, it relates to a catalyst for catalytically decomposing nitrogen oxides, and a method for catalytically decomposing nitrogen oxides by using the catalyst, which suffers little deterioration even when coexisting with oxygen or sulfur oxides.

2. Description of the Related Art

Nitrogen oxides in combustion waste gases discharged from, for example, industrial plants and automobiles, are major causes of photochemical smog, and the development of methods of eliminating these substances is a crucial and urgent social need from the standpoint of environmental protection. Among the nitrogen oxides, nitric monoxide (NO) is particularly difficult to remove, and various methods of accomplishing this have been investigated. For example, the catalytic reduction method is considered effective, and rapid progress has been made in the development of this method. Nevertheless, this method requires the use of a reducing agent such as ammonia, hydrogen or carbon monoxide, and further, requires special equipment for the recovery or decomposition of any unreacted reducing agent. In contrast, the catalytic decomposition method does not require a special additive such as the reducing agent and can decompose and separate a nitrogen oxide into nitrogen and oxygen merely by passing it through a catalyst bed. Further, the process is simple, and therefore, this is the most preferable method. According to previous research, a NO decomposition activity was observed in Pt and CuO, $Co_3O_4$, among others, but because all of these substances are poisoned by oxygen, which is the decomposition product, they are not practically useful as catalysts.

Accordingly, the present inventors carried out intensive studies on catalysts useful for catalytic decomposition, and found that several kinds of zeolites with exchanged copper ions exhibit a stable decomposition activity. Further, the inventors found that a zeolite containing copper ions and having a specific crystal structure not only exhibits an extremely stable and high activity as a catalytic decomposition catalyst for NO, but also maintains that activity at the same level even when coexisting with a sulfur oxide (see Japanese Unexamined Patent Publication (Kokai) No. 60-125250).

Nevertheless, the above-mentioned catalyst does not have a sufficient activity or sufficient heat resistance at high temperatures, and thus can not as yet be put to practical use.

SUMMARY OF THE INVENTION

Accordingly, the objects of the present invention are to eliminate the above-mentioned disadvantages of the prior art and to provide a catalytic decomposition catalyst which efficiently removes nitrogen oxides in the combustion waste gas discharged from, for example, industrial plants and automobiles, at high temperatures and without the use of ammonia as a reducing agent, and further, maintains a high level of activity even when coexisting with sulfur oxides and oxygen.

Other objects and advantages of the present invention will be apparent from the following description.

In accordance with the present invention, there is provided a catalyst for catalytically decomposing nitrogen oxides comprising a zeolite having a mole ratio of $SiO_2/Al_2O_3$ of at least 20 and containing copper ions and magnesium ions, and a method of catalytically decomposing nitrogen oxides from a gas containing the same, which comprises bringing a catalyst comprising a zeolite having a mole ratio of $SiO_2/Al_2O_3$ of at least 20 and containing copper ions and magnesium ions into contact with the gas containing nitrogen oxides.

DESCRIPTION OF THE PREFERRED EMBODIMENTS

The present invention is now described in more detail.

The zeolite usable in the present invention essentially must have a mole ratio of $SiO_2/O_3$ of at least 20. The upper limit of the $SiO_2/Al_2O_3$ mole ratio is not particularly limited, but if the $SiO2/Al_2O_3$ mole ratio is less than 20, a required heat resistance can not be obtained. Preferably, a zeolite having a $SiO_2/Al_2O_3$ mole ratio of about 20 to 200, more preferably 20 to 100, may be used.

As is well known in the art, the zeolite is a crystalline aluminosilicate having the general formula:

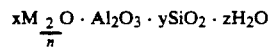

$$x\underset{n}{M_2} O \cdot Al_2O_3 \cdot ySiO_2 \cdot zH_2O$$

wherein M is a metal, n is a valence number of the metal M, and x, y, and z are independently a positive number.

Typical examples of the zeolite constituting the catalyst of the present invention, are zeolites such as ZSM-5, ZSM-8, ZSM-11, ZSM-12, ZSM-20, and ZSM-35, especially, ZSM-5 is preferably used. The methods of preparation of these zeolites are not particularly limited, and zeolites such as Mordenite, Ferrierite, Y-type zeolite, and L-type zeolite subjected to dealumination also may be used. These zeolites can be used either as such or after treatment with an ammonium salt or a mineral acid and an $NH_4$ ion exchange or H ion exchange, before use.

A typical example of the catalytic decomposition catalyst of the present invention is a zeolite having a mole ratio of $SiO_2/Al_2O_3$ of at least 20 and containing copper ions and magnesium ions incorporated by an ion exchange.

The copper ions and magnesium ions in the above-mentioned zeolite can be incorporated by, for example, an ion exchange method. This method is not particularly limited, and those generally practiced as the ion exchange method can be used. For example, the ion exchange may be effected by using an aqueous solution containing copper ions and magnesium ions, or an ion exchange with magnesium ions may be carried out after an exchange with copper ions, or an ion exchange with copper ions may be carried out after an exchange with magnesium ions. The concentrations of copper ions and magnesium ions in the aqueous solution during the ion exchange can be appropriately set in accordance with degrees of ion exchange.

The copper ions and magnesium ions can be used in the form of soluble salts, and as such soluble salts, nitrates, acetates, oxalates, and chlorides are suitable.

During the ion exchange of copper ions as described above, ammonia also may be added to control the pH so as to increase the copper ion content in zeolite.

Since the copper ion existing at the ion exchange site of the zeolite is the active site, the copper is preferably exchanged at the ion exchange site. Also, the magnesium ion is preferably ion exchanged at the ion exchange site, but the effect thereof can be also exhibited when loaded on the zeolite as a compound such as oxide.

The zeolite subjected to the ion exchange treatment is subjected to solid-liquid separation, washing and drying before use, and further, can be calcined, if necessary.

The degree of copper ion exchanged is preferably 0.01 to 1, more preferably 0.1 to 0.8, as represented in terms of the Cu/Al atomic ratio, and the degree of magnesium ion exchanged is preferably 0.01 or more, more preferably 0.05 to 1, in terms of the Mg/Al ratio. When the Cu/Al atomic ratio is less than 0.01, the number of copper ions, which are active sites, are not sufficient to provide the required catalytic activity, and when the ratio is higher than that, copper will exist on the zeolite surface as a compound such as oxide, and thus the effect corresponding to the increased content of the copper ions may not be obtained. Also, when the Mg/Al atomic ratio is less than 0.01, the effect provided by the coexistence of magnesium ion is small, and thus a sufficient heat resistance may not be obtained.

The $SiO_2/Al_2O_3$ mole ratio of the catalytic decomposition catalyst is substantially the same as the $SiO_2/Al_2O_3$ mole ratio of the zeolite base material used. Also, the crystal structure of the catalytic decomposition catalyst after ion exchange is not substantially changed from that before the ion exchange.

The catalytic decomposition catalyst also can be used as a mixture molded with a binder such as a clay mineral, and further, the zeolite may be previously molded and copper and magnesium ions incorporated by ion exchange into the molded product. The binder usable during the molding of the zeolite may include clay minerals such as kaloin, attapulgite, montmorillonite, bentonite, allophane, and sepiolite. Alternatively, a binderless zeolite molded product obtained by a direct molding without the use of a binder may be used.

A catalytic decomposition of nitrogen oxides in the waste gas can be performed by bringing the catalytic decomposition catalyst into contact with a waste gas containing nitrogen oxides. There are no critical limitations to the contacting conditions.

The above-mentioned catalytic decomposition catalyst can also exhibit a catalyst performance similar to that of the zeolite catalyst of the prior art having copper loaded thereon, even when applied to a waste gas containing, for example, carbon monoxide, ammonia, hydrocarbons, water, oxygen and sulfur oxides.

As disclosed in Japanese Unexamined Patent Publication (Kokai) No. 60-125250, a crystalline aluminosilicate having a specific structure containing copper ions can efficiently remove nitrogen oxides even from a waste gas not containing a reducing agent. This is because the redox cycle of copper ions subjected to an ion exchange becomes easier due to the specific crystal structure of the crystalline aluminosilicate, and nitrogen oxides are decomposed by this redox cycle into nitrogen and oxygen. Also, copper ions are hard to be poisoned by oxygen, which is the decomposed product of nitrogen oxides, so that the decomposition activity can be maintained high level over a long time.

Nevertheless, the above-mentioned crystalline aluminosilicate having exchanged copper ions suffers from an excessive reduction of the copper ions at a high temperature, whereby the redox cycle of copper ions is obstructed and a required level of activity is not maintained.

The catalyst of the present invention has copper ions and magnesium ions incorporated in a zeolite, and by permitting magnesium ions to coexist therein, the heat resistance of the zeolite itself can be improved, and further, an excessive reduction of the copper ions is prevented, whereby a catalytic decomposition catalyst having a high level of activity and a high stability even at high temperatures is obtained.

The nitrogen oxide catalytic decomposition catalyst of the present invention efficiently removes nitrogen oxides in a combustion waste gas, at high temperatures and without the use of a reducing agent such as ammonia, and further, has a very high heat resistance. Therefore, by bringing the catalyst of the present invention into contact with a waste gas, the removal of nitrogen oxides therefrom can be effected at high temperatures.

EXAMPLES

The present invention will now be further illustrated by, but is by no means limited to, the following Examples.

EXAMPLE 1

Into an overflow type reactor having an actual volume of 2 liters, an aqueous sodium silicate solution ($SiO_2$: 153 g/liter; $Na_2O$: 50 g/liter, $Al_2O_3$: 0.8 g/liter) and an aqueous aluminum sulfate solution ($Al_2O_3$: 38.4 g/liter; $H_2SO_4$: 275 g/liter) were continuously fed at rates of 3.2 liter/hour and 0.8 liter/hour, respectively, with stirring. The reaction temperature was 30° to 32° C. and the pH of the discharged slurry was 6.4 to 6.6.

The discharged slurry was subjected to solid-liquid separation, and the solid thoroughly washed with distilled water to obtain a granular amorphous aluminosilicate uniform compound having $Na_2O$: 1.72 wt.%; $Al_2O_3$: 2.58 wt.%; $SiO_2$: 39.3 wt.%; and $H_2O$: 56.4 wt.%. An amount of 2,840 g of the uniform compound and 5,160 g of an aqueous 1.39 wt.% NaOH solution were then charged into an autoclave, and crystallization was effected at 160° C. for 72 hours with stirring. The product was subjected to solid-liquid separation, and the solid washed with water and dried to obtain a ZSM-5 type zeolite. A chemical analysis of the composition of the zeolite showed that it had the following composition, as represented by the mole ratio of oxides in the anhydrous basis: 1.1 $Na_2O$, $Al_2O_3$ and 23.3 $SiO_2$.

A 10 g amount of the zeolite was added to one liter of an aqueous 0.1 N magnesium nitrate solution, and the mixture was stirred at 60° C. for one day to carry out an ion exchange treatment. After this operation was repeated, the product was washed to obtain a zeolite exchanged with magnesium ions. Then, one liter of an aqueous 0.012 N copper acetate solution was added, and the mixture then stirred at 60° C. for 3 hours to carry out an ion exchange treatment. After this operation was repeated, the product was washed and dried to prepare a catalyst 1. A chemical analysis showed that the catalyst 1 had a composition, as represented by a mole ratio of oxides in the anhydrous basis, of: 0.89 MgO, 0.55 CuO and $Al_2O_3$, and 23.3 $SiO_2$.

EXAMPLE 2

The catalytic decomposition performance was tested by using the catalyst obtained in Example 1.

The catalyst was press-molded and then pulverized to be formed into granules having a mesh size (Tylor) of 42 to 80; and 2 cc of the granules were filled in an atmospheric pressure fixed bed flow type reactor. After a pretreatment at 500° C. in He gas for one hour, an He gas containing 1% of NO was passed therethrough for a contact time of 4.0 g.sec/ml.

The NO conversions at the respective temperatures are shown in Table 1.

TABLE 1

| Temperature | NO conversion (%) |
| --- | --- |
| 400° C. | 68 |
| 500° C. | 93 |
| 600° C. | 94 |
| 700° C. | 65 |

COMPARATIVE EXAMPLE 1

A 10 g amount of the ZSM-5 type zeolite obtained in Example 1 was added to one liter of an aqueous 0.012 N copper acetate solution, and the mixture was stirred at 60° C. for 3 hours to carry out an ion exchange treatment. After this operation was repeated, the product was washed and dried to prepare a comparative catalyst. A chemical analysis showed that this comparative catalyst had the following composition, as represented by the mole ratio of oxides in the anhydrous basis: 0.45 $Na_2O$, 0.69 CuO, $Al_2O_3$, and 23.3 $SiO_2$.

COMPARATIVE EXAMPLE 2

The catalytic decomposition performance of the Comparative catalyst was tested in the same manner as in Example 1 by using the catalyst obtained in Comparative Example 1.

The results are shown in Table 2.

TABLE 2

| Temperature | NO conversion (%) |
| --- | --- |
| 400° C. | 76 |
| 500° C. | 90 |
| 600° C. | 58 |
| 700° C. | 5 |

As clear from Table 1 and Table 2, the nitrogen oxide catalytic decomposition catalyst of the present invention can efficiently remove nitrogen oxides in a gas, when contacted with the gas even at high temperatures, and thus exhibits a very high heat resistance.

We claim:

1. A method of removing nitrogen oxides from a gas containing the same by catalytically decomposing the nitrogen oxides, which comprises contacting a catalyst with a gas containing nitrogen oxides at a temperature sufficient to decompose the nitrogen oxides, thereby removing the nitrogen oxides by catalytic decomposition, said catalyst comprising a zeolite having a mole ratio of $SiO_2/Al_2O_3$ of at least 20 and containing copper ions in an amount of 0.01 to 1 in terms of the Cu/Al atomic ratio and magnesium ions in an amount of at least 0.01 in terms of the Mg/Al atomic ratio.

2. The method of claim 1 wherein the nitrogen oxides are decomposted at a temperature in the range of 400° C. to 700° C.

* * * * *